Sept. 22, 1964     O. LUTHI     3,150,083
FILTERS
Filed Jan. 30, 1961     2 Sheets-Sheet 1
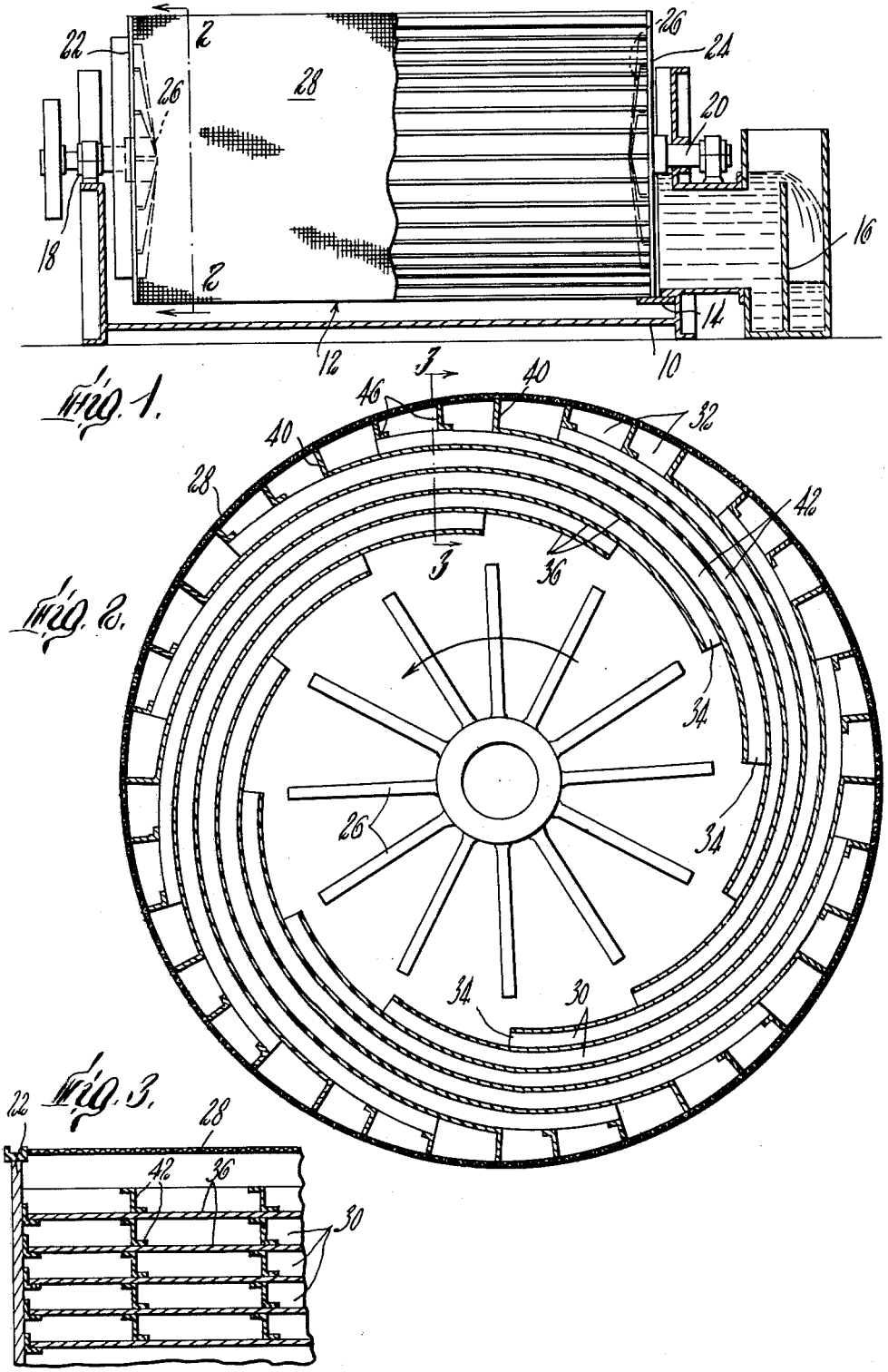

Sept. 22, 1964  O. LUTHI  3,150,083
FILTERS
Filed Jan. 30, 1961  2 Sheets-Sheet 2

United States Patent Office 3,150,083
Patented Sept. 22, 1964

3,150,083
FILTERS
Oscar Luthi, Nashua, N.H., assignor, by mesne assignments, to Improved Machinery, Inc., a corporation of Delaware
Filed Jan. 30, 1961, Ser. No. 85,786
3 Claims. (Cl. 210—404)

The present invention relates to rotary drum filters and more particularly to a novel filter of the so-called valveless vacuum type.

Valveless vacuum filters of the type disclosed in Patent Nos. 1,816,132 and 2,537,414, for example, operate under a low vacuum head internally generated by the rotation of the filter drum, such being accomplished by the use of filtrate passageways bent backward with respect to the direction of drum rotation. Although such filters are widely used, the necessity of providing a multiplicity of filtrate passageways of substantial angular extent capable of operating at high filter efficiency has proved to be a difficult problem. More specifically, for high filter efficiency, at least about twelve separately drained filter surface drum sectors must be used, and the minimum length of the backwardly bent filtrate passageways must be at least about 90 degrees. These limitations, though, establish severe requirements of drum construction because of the multiplicity of necessary ducts or other filtrate passageways needed. For example, the construction of the above mentioned patents results in a series of axially extending filtrate troughs, one for each drum sector just beneath the filter surface sector, each of said troughs having a relatively longitudinally narrow backwardly bent filtrate duct connected thereto, but with such a construction most of the filtrate cannot move directly into and through the filtrate duct, as is most desirable, but must of necessity travel long distances up to ten or twenty feet before being removed from the vicinity of the filter cake. Such operation reduces filter efficiency for a variety of reasons.

Accordingly, it is a primary object of the present invention to provide a rotary drum filter of the valveless vacuum type wherein each bent backward passageway draining a drum sector extends for the entire length of the filter drum so that filtrate may pass directly into and through the filtrate passageway without the necessity of movement in an axial direction along the length of the drum.

It is another object of the invention to provide an improved and more efficient rotary drum filter of the valveless vacuum type which will provide a maximum number of drum sectors each with an independent passageway and will at the same time provide a most efficient shape, construction and arrangement of said passageways from a mechanical standpoint as well as from the standpoint of hydraulic efficiency.

These objects of the invention have been accomplished in a novel manner by providing an annular filter surface and filtrate passageway defining supporting structure comprising a series of overlapping sheet partitioning members defining at least about twelve and preferably even more drum sectors with at least three and preferably four or more overlapping, closely packed involute filtrate passageways about the drum. Each of these passageways extends for the entire length of the drum sector drained thereby and has its inlet at a peripheral filter surface sector of the drum and its outlet within the drum spaced from the axis thereof and rearwardly of said inlet in the direction of drum rotation to provide a filtrate passageway bent backward and extending for at least about 90 degrees around the drum. It is especially important that the multiple overlapping passageway defining sheet members be in the form of an involute so that their spacing will be uniform throughout their peripheral length. This not only improves the hydraulic efficiency of the filtrate passageways, but, even more important, it makes possible the use of a plurality of series of spacers, with each series spaced axially along the drum, each of said spacers being of uniform height, since they extend between the uniformly spaced sheet members, and extending continuously in a peripheral direction throughout the length of a passageway, to support said members one from another in order that suitable drum rigidity may be achieved.

The several features of the invention will be readily understood by one skilled in the art from the following description of a preferred embodiment thereof taken in connection with the accompanying drawings, in which:

FIG. 1 is a view in elevation of a rotary drum filter assembly embodying the several features of the invention, a portion of the filter screen having been broken away to show underlying parts;

FIG. 2 is a sectional view taken on a line 2—2 of FIG. 1 to illustrate particularly the arrangement of involute plates and passageways formed thereby;

FIG. 3 is a somewhat fragmentary detailed sectional view taken on a line 3—3 of FIG. 2 to illustrate particularly the location of the involute spacers and supports employed by the adjacent involute plates;

Figure 4:
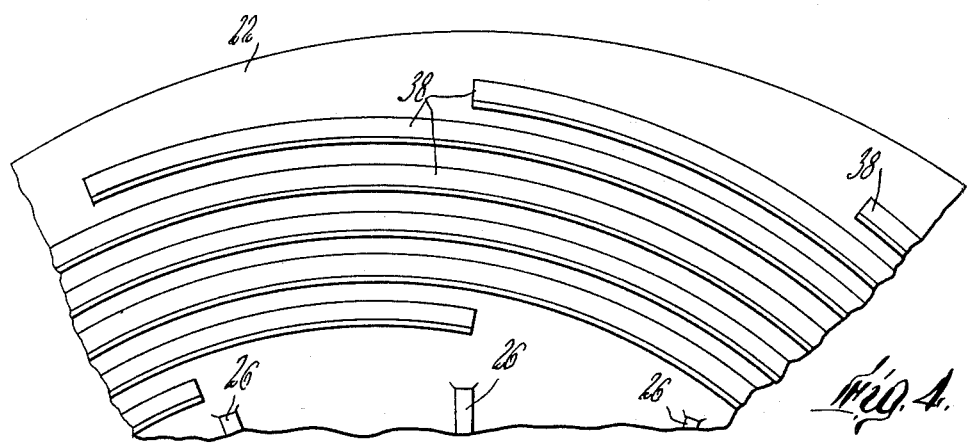
FIGS. 4 and 5 are enlarged detailed sectional views similar to FIG. 2 illustrating particularly the manner in which the cylinder is built up.
Figure 5:
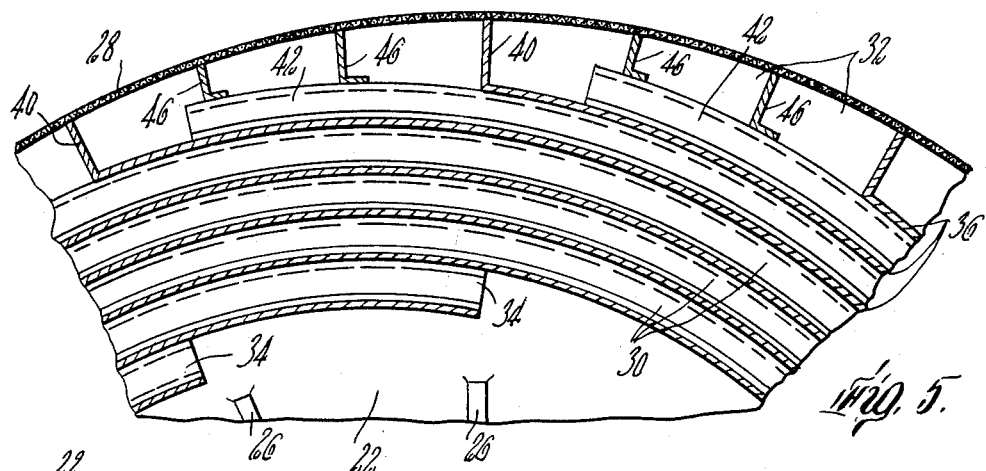
Figure 6:
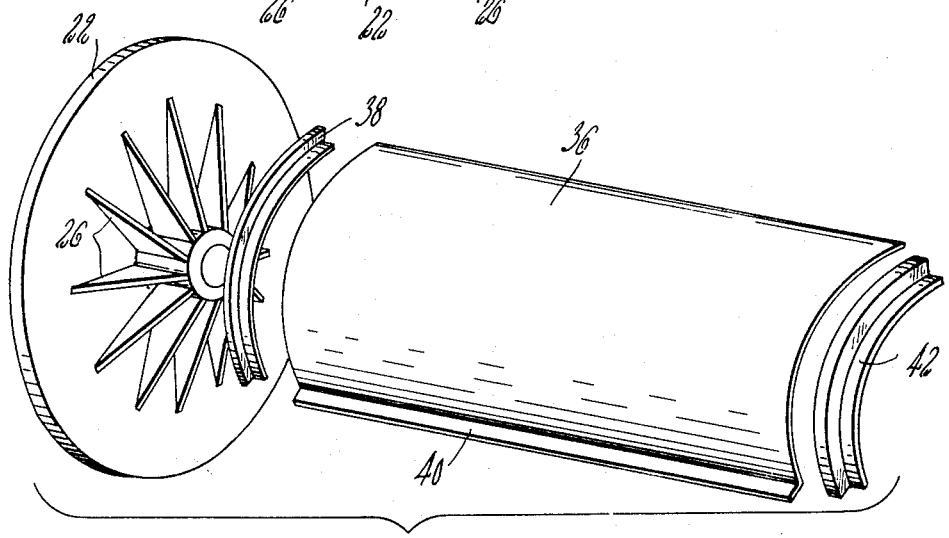
FIG. 6 is a detailed exploded perspective view of one of the involute plates and its associated elements.

The rotary drum filter assembly shown in FIG. 1 of the drawings includes a suitable tank 10 in which the drum assembly, generally designated 12, is partially immersed in the slurry to be filtered. The drum assembly 12 is provided with two trunnions 18, 20 which project outwardly from the two ends of the assembly for engagement in suitable bearing supports. Two end plates 22, 24 are provided supported by means of radial spokes 26 carried on the trunnions. One of said end plates is in the form of an annulus so that filtrate may flow therethrough to the usual weir structure 16, a suitable deckle band 14 being provided thereat for fluid sealing. The outside surface of the drum assembly comprises a filter screen 28 which covers the entire peripheral surface of the cylinder between the two end plates.

According to the present invention, inside the filter screen there are provided a multiplicity of filtrate passageways 30, at least about twelve in number as shown or more if desired, each extending for the entire length of the drum assembly and having an inlet opening 32 facing the inner surface of the filter screen 28, and an exhaust opening 34 within the cylinder spaced from the inlet opening a substantial distance arcuately of the cylinder rearwardly of the direction of the drum assembly rotation. The passageways 30 and their inlet openings 32 are so constructed and are so arranged with relation to each other that the inlets 32 underlie all portions of the screen, with each passageway defining a separate drum sector of no more than about 30 degrees angular extent. Such passageways must be at least 90 degrees in length and preferably about 120 degrees as shown.

The passageways 30 are defined between adjacent overlapping involute plates 36 of a stacked series which are provided in uniformly spaced relation to one another about the internal periphery of the cylinder. This provides with the structure illustrated a stack of four passageways at any radius of the drum assembly, although a stack of three may be used with shorter passageways. A stack of more than four may also be used if the drum sectors be decreased in angular extent from that shown, as may be desirable especially in large filters. Each involute plate 36 is attached at its edges by means of correspondingly curved angle irons 38 to the end plates 22, 24.

Each plate terminates at its inner end in a straight edge running parallel to and spaced from the rotational axis of the filter assembly. At its outer end each involute plate 36 is formed with an outwardly turned flange 40 which rests against the inner surface of the filter screen 28 and defines the drum sectors.

As mentioned above, it is vital for drum rigidity that the involute plates be supported one from another intermittently throughout the length of the drum. To this end, the involute plates 36 are provided with series of Z-shaped spacers 42 of uniform height which conform to the involute curve of the plates 36 around the rotational axis of the filter assembly and are spaced axially along the drum from one another. Each spacer 42 is extended beyond the flanged outer end 40 of its overlying involute plate 36 and provides support for filter screen supporting, longitudinally extending members 46 spaced equal distances between flanges 40 to provide additional support for the filter screen 28. Said screen is secured over the flanges 40 and the screen supporting members 46 by drum encircling metal bands (not shown) in the usual manner.

Thus, it will be seen that the invention provides a novel filter assembly comprising a series of overlapping spaced involute plates with spacers therebetween providing a corresponding series of backwardly and inwardly curved passageways each extending between a filter screen sector and the interior of the cylinder for the entire length of said sector providing for direct movement of filtrate into the drum without any axial movement thereof. Various modifications of the invention within the spirit thereof and the scope of the appended claims will be apparent to those skilled in this art.

What is claimed is:

1. A rotary drum filter having, in combination, a cylindrical supporting structure including end plates normal to the rotational axis, supports secured to said end plates at spaced intervals about the rotational axis, said supports having involute curves and extending axially inwardly from said end plates, a series of overlapping involute plates supported at their edges by said supports, said involute plates having their inner ends spaced radially from said rotational axis and their outer ends terminating adjacent the peripheral surface of said structure forming a series of passageways therebetween, said involute plates being spaced at equal intervals about said rotational axis and being spaced a uniform distance from one another throughout their peripheral length, a plurality of spacers of uniform height conforming to the distance between adjacent involute plates and extending continuously in a peripheral direction between adjacent involute plates throughout the entire length of said passageways, said spacers being axially spaced from one another and following the involute curve of said plates around said axis, each said involute plate being provided at its outer end with a longitudinally extending member defining separate passageway inlets for the passageways included between adjacent involute plates, said involute plates and spacers defining a series of at least three such involute passageways, said passageways being stacked over each other and having inlets at the peripheral surface of said structure and outlets within said structure spaced rearwardly of the inlets in the direction of rotation, and a cylindrical filter screen extending circumferentially around said cylindrical supporting structure supported by said end plates and said longitudinally extending members.

2. A filter as claimed in claim 1 wherein each inlet extends along said peripheral surface for less than 30 degrees and the length of each of said passageways is more than 90 degrees.

3. A filter as claimed in claim 2 wherein four stacked involute passageways are provided, and the length of each of said passageways is about 120 degrees.

References Cited in the file of this patent
UNITED STATES PATENTS 2,537,414   Lindblad _____ Jan. 9, 1951

FOREIGN PATENTS 115,974   Sweden _____ Mar. 5, 1946